United States Patent [19]

Richards et al.

[11] 4,176,736

[45] Dec. 4, 1979

[54] BLOCKED CHANGE GEAR TRANSMISSION AND IMPROVED BLOCKER AND JAW CLUTCH ASSEMBLY THEREFOR

[75] Inventors: Elmer A. Richards; Carl D. Roberts, both of Kalamazoo, Mich.

[73] Assignee: Eaton Corporation, Cleveland, Ohio

[21] Appl. No.: 861,785

[22] Filed: Dec. 19, 1977

[51] Int. Cl.² ............................................. F16D 23/06
[52] U.S. Cl. .................................... 192/53 F; 74/339
[58] Field of Search ....................... 192/53 F; 74/339

[56] References Cited

U.S. PATENT DOCUMENTS

| | | | |
|---|---|---|---|
| 1,923,386 | 8/1933 | Murray | 192/53 F |
| 3,175,413 | 3/1965 | Peras | 74/339 |
| 3,400,601 | 9/1978 | Ruhl et al. | 74/339 |
| 3,799,002 | 3/1974 | Richards | 74/745 |
| 3,910,131 | 10/1975 | Richards | 74/339 X |
| 3,921,469 | 11/1925 | Richards | 74/339 |
| 3,924,484 | 12/1975 | Richards | 74/339 X |
| 3,983,979 | 10/1976 | Richards | 192/53 F |

*Primary Examiner*—Allan D. Hermann
*Attorney, Agent, or Firm*—R. J. McCloskey; H. D. Gordon

[57] ABSTRACT

An improved, blocked, change gear transmission having an input shaft normally driven by a one-way prime mover and an output shaft normally connected to a driven device is provided. The transmission utilizes at least one improved blocker and jaw clutch assembly which allows engagement of a selected ratio gear under static conditions, i.e., when the driven device is at rest and the blocked transmission is in neutral.

27 Claims, 16 Drawing Figures

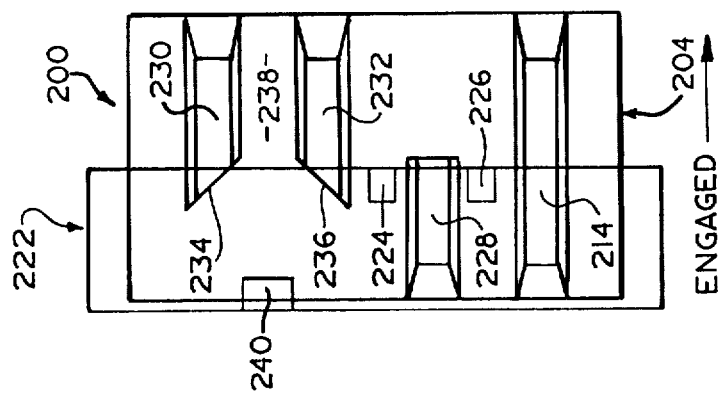
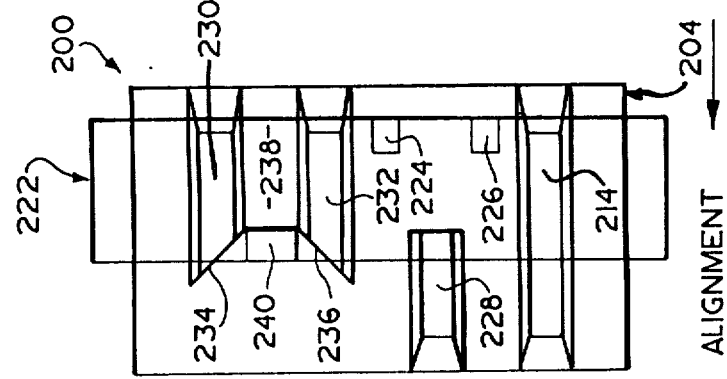
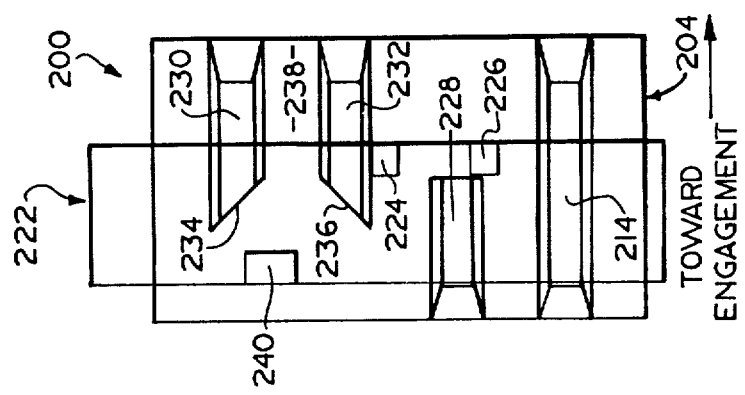
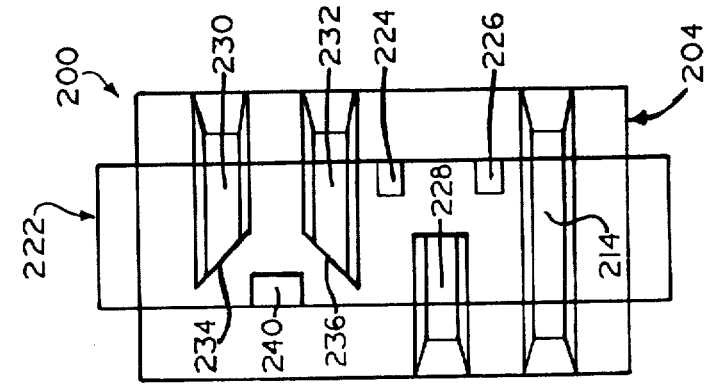

BLOCKED CHANGE GEAR TRANSMISSION AND IMPROVED BLOCKER AND JAW CLUTCH ASSEMBLY THEREFOR

BACKGROUND OF THE INVENTION

1. Field of the Invention

This invention relates to shiftable, blocked, change speed gear devices, preferably multiple countershaft floating mainshaft transmissions having resiliently yieldable shifting means utilizing blocker and jaw clutch assemblies for substantially simplifying shifting of the transmissions, and in particular relates to shiftable, blocked, change gear transmissions normally driven by one-way prime movers and utilizing improved blocker and jaw clutch assemblies effective to allow engagement of at least one selected ratio gear under static conditions.

2. Background of the Invention

In the design of transmissions, particularly heavy duty transmissions, such as for example are used in trucks, there has existed for a long time the problem of shifting the transmission to the various gear ratios, which problem is even greater when the transmission is provided with an auxiliary transmission section of the range or the splitter type for increasing the number of gear ratios. In most known transmissions, the shifting process is either relatively difficult and/or the shifting mechanism is relatively complex. Thus, there has been a continuing effort in the design of transmissions to improve the shifting, to improve the rapidity of shifting, to reduce the complexity of the shifting mechanism, and to reduce its costs. Hence, without detracting in any way from the operability or desirability of many of the shifting mechanisms previously known, it may be stated that in the present invention these general objectives are accomplished to even a greater degree than has been previously possible.

Particularly, most previously known transmissions have required a relatively high level of operator skill or necessarily utilized synchronizers, of which many different types are known, for causing the speed of the jaw or tooth clutch members to be substantially synchronized prior to permitting their interengagement during a shifting sequence from one speed ratio to another speed ratio. While the use of synchronizers does permit the shifting operation to be performed, their use, as is already known, imposes certain requirements of weight, space and power which is desirable to ease, or avoid entirely, if possible.

These and other problems incident to previously known transmissions were set forth and acknowledged in U.S. Pat. Nos. 3,799,002, entitled "TRANSMISSION WITH RESILIENTLY LOADED MAIN SHAFT GEARS"; 3,910,131, entitled "TRANSMISSION WITH SNAP SHIFT"; 3,921,469, entitled "TRANSMISSION WITH RESILIENTLY LOADED MAIN SHAFT GEARS"; 3,924,484, entitled "SENSOR UNBLOCKING RAMPS"; and 3,983,979, entitled "SENSOR UNBLOCKING RAMPS"; all hereby incorporated by reference and assigned to the same assignee as the present application. Apparatus is disclosed in the above mentioned patents which effectively meets the problems while providing a reliable, effective and efficient transmission, particularly for heavy duty use.

While both forms of the inventions disclosed in said patents, namely, those using blockers and those not using blockers, are effective for carrying out the objectives thereof, it has been noted that for the usual reasons both noise and clutch tooth wear can be minimized by the use of blockers as set forth in said patents and since the date thereof a considerable amount of investigation has been carried out related thereto, both for simplifying of the blocker structure and for improving the operation of said blockers and of transmissions utilizing same. Blockers of various types are well known in the prior art and examples thereof may be seen by reference to the above mentioned patents and to U.S. Pat. No. 3,503,280, entitled "BLOCKER DEVICE", issued to W. C. Bopp, and assigned to the assignee of this application.

Blockers of the type illustrated in the above mentioned patents are generally nondeformable devices designed to prevent, or block, the engagement of the axially engageable jaw clutch members of a jaw clutch when said members are rotating at substantially different speeds, i.e., are not substantially synchronized. Transmissions utilizing such blockers are referred to herein as "blocked transmissions". Blocked transmissions are transmissions utilizing blockers to prevent jaw clutch engagement if the members of the jaw clutch are not substantially synchronized. This is in contrast to "synchronized transmissions" which utilize synchronizer clutches to cause the jaw clutch members to be synchronized. The relatively nondeformable blockers utilized with many of the prior art blocked transmissions are generally retained on one clutch member for rotation therewith with a limited amount of relative rotation (3°-15°) provided. The one clutch member is usually that clutch member rotationally fixed to the transmission mainshaft. The blocker and the one clutch member will define an array of first projections or teeth or the like which will allow the one clutch member to move relatively axially towards the other clutch member when in alignment but will block such relative axial movement when said blocker is rotated in either the clockwise or counterclockwise direction relative to the one clutch member. The blocker is designed to be in positive frictional contact with the second clutch member during an engaging operation and will thus tend to rotate with the second clutch member. Random frictional contact will usually cause, or tend to cause, the blockers to rotate with the second clutch members at times when a clutch engagement is not attempted.

By way of example, assuming the use of a relatively nondeformable blocker as disclosed in the above mentioned prior art and that the clutch members are rotating in a clockwise direction, if the first clutch member is rotating faster than the second clutch member, upon initiation of an engaging operation the blocker will be rotated counterclockwise relative to the first clutch member and the blocker will prevent axial movement of the first clutch member towards the second clutch member. If the second clutch member is rotating faster than the first clutch member, the blocker will be rotated clockwise relative to the first clutch member and the blocker will prevent axial movement of the first clutch member towards the second clutch member. If the first clutch member initially rotates faster, then slower than the second clutch member, the blocker would, relative to the first clutch member, rotate in a clockwise direction from an initial counterclockwise rotated position relative to the first clutch member towards a relatively clockwise rotated position. During the relative rotation, for at least a limited period of time, the blocker would align with the first clutch member and cease to block axial movement thereof towards the second clutch member. Such relative movement of the clutch members and the blocker is generally referred to as "passing through synchronous". The clutch will "pass through synchronous" or "cross synchronous" as the two clutch members reach a substantially synchronous rotation, and the clutch engaging operation, or the gear shift, should be completed at this time. As the blocker is designed to be in positive frictional contact with the second clutch member only during a clutch engaging operation to prevent undue frictional wear, it is possible, under certain conditions, that the blocker can be set up on the "wrong side of synchronous" at the initiation of a clutch engaging operation, i.e., referring to the above example, rotated clockwise relative to the first clutch member when the first clutch member was rotating faster than the second clutch member or vice versa. Under such conditions, especially if the driven device is stopped, it is difficult or impossible to cause the blocker to "pass through synchronous" and the transmission cannot, without undue manipulation, be shifted into the desired gear ratio.

In a blocked transmission driven by a one-way prime mover, the blocked clutch members have an inherent problem of achieving jaw clutch engagement under certain static conditions, i.e., when the driven device is standing still and the transmission is in neutral. When a blocked transmission of the twin countershaft type, as is illustrated in U.S. Pat. Nos. 3,799,002 or 3,924,484, is in neutral with the master clutch engaged, the gearing will, for at least a period of time, rotate while the output or main shaft is stationary. The aforementioned condition tends to place the blockers in the "upshift position", i.e., that position associated with a dynamic upshift wherein the jaw clutch member rotating with the main shaft must be rotated faster than the clutch member rotating with the gearing to cause the clutch to pass through synchronous. When the gearing comes to a stop, the blockers remain in the "upshift position" and, because it is difficult and/or impossible to rotate the main shaft with the transmission in neutral, a reversing of the gearing or an auxiliary aligning of the blockers and jaw clutch members is required to achieve a jaw clutch engagement.

In compound, blocked transmissions of the type seen in U.S. Pat. Nos. 3,799,002 and 3,924,484, relative overspeeding of the auxiliary transmission gearing by the main shaft can be achieved by the operator momentarily shifting the transmission from neutral into reverse as reverse gear is normally not a blocked gear. But this is obviously an inconvenience, a highly undesirable technique, and might hamper the commercial acceptability of an otherwise highly successful transmission.

Self-aligning blockers, when utilized with an input brake such as an input shaft brake, are believed to be an effective auxiliary method of obtaining clutch engagement of a blocked transmission at a static condition. However, due to manufacturing, space, cost and operational considerations, the experimental self-aligning blockers utilized in the past have not been totally satisfactory.

SUMMARY OF THE INVENTION

In accordance with the present invention, many of the drawbacks of the prior art have been overcome by the provision of a blocked, change gear transmission driven by a one-way prime mover utilizing at least one improved blocker and jaw clutch assembly of the self-aligning type which is effective to allow engagement of at least one selected ratio gear in static conditions, i.e., when the transmission is in neutral and the device driven by the transmission is at rest.

The transmission preferably has an input shaft driven by a one-way prime mover through a normally engaged selectively disengageable master friction clutch, a selectively or automatically engageable input brake, a plurality of countershafts, a floating mainshaft and includes gear pairs arranged on and cooperatively between the shafts. The transmission is provided with positive clutches, preferably spring loaded jaw clutches, for selectively effecting connection to one of said shafts, preferably the mainshaft, of a selected one gear, preferably a mainshaft gear, upon the achievement of substantial synchronization between such gear and such shaft. Blockers are provided for protecting the positive clutch teeth from excessive wear during such engagement or shifting. Said blocker and jaw clutch assemblies comprising a first array of projections which will align when the jaw clutch members pass through synchronous allowing axial engagement of the jaw clutch members. At least one of said blocker and jaw clutch assemblies includes means effective upon axial movement of one jaw clutch member thereof away from the other jaw clutch member thereof to cause the blocker splined to the jaw clutch member to rotate relative to that jaw clutch member sufficiently to align the first array of projections on the blocker and jaw clutch member. It is understood that any relative rotation between the blocker and jaw clutch member to which it is splined resulting in alignment of the first array of projections is sufficient for purposes of the present invention. If the transmission includes an input brake, and if the input brake is engaged, the blocker and jaw clutch member first array of projections will remain in alignment as the clutch members are moved axially together allowing the jaw clutch member carrying the blocker to engage the other jaw clutch member for engaging the selected ratio gear.

In the preferred embodiment, the improved blocker and jaw clutch assemblies will be utilized in connection with an axially interconnected pair of axially shiftable mainshaft gears which are controlled by a shift fork on a single shift rod and the blockers will be axially interconnected to the mainshaft gears for axial movement therewith with a limited degree of axial freedom. By way of example, second and third speed ratio gears in the main transmission section are often an axially interconnected pair. To engage the second speed ratio gear under static conditions, with the input shaft brake engaged, the operator would shift towards the third speed ratio gear, thus separating the second speed ratio gear jaw clutch members and aligning the jaw clutch member thereof splined to the blocker with the blocker. The operator would then shift toward the second speed ratio gear and would be able to engage same as the blocker associated therewith would be properly aligned with the jaw clutch member to which it is splined allowing that jaw clutch member to pass through the blocker and into engagement with the other jaw clutch member.

The means for causing alignment of the first array of projections comprises a second array of projections including a second set of adjacent projections or partially removed teeth extending from one of the blocker or the jaw clutch member splined to the blocker and a second tooth extending from the other of the blocker or the jaw clutch member splined to the blocker. The second tooth is sized to fit in the space between the projections of the second set of adjacent projections or partially removed teeth and will align with and will pass through the space between the projections of the second set of projections when the first array of projections is aligned. A pair of relatively steep ramps on the second set of adjacent projections, inclined inwardly toward the space between the projections, when axially engaged with the second tooth under pressure will cause the second tooth to align with the space between the projections of the second set of projections.

Accordingly, it it an object of the present invention to provide a new and improved blocked change gear transmission and an improved blocker and jaw clutch assembly for use therewith.

Another object of the present invention is to provide a new and improved resiliently shifted change speed blocked transmission of the type having a main shaft, a plurality of main shaft gears selectively clutchable to said main shaft, at least one countershaft and including at least one improved blocker-jaw clutch assembly wherein said improved blocker-jaw clutch assembly is effective to allow engagement of a selected gear under static conditions.

A further object of the present invention is to provide an improved blocked change gear transmission including a new and improved self-aligning blocker-jaw clutch assembly of simpler construction, greater reliability, easier utilization and/or of lower manufacturing cost which will substantially reduce or eliminate the difficulty of engaging a selected gear under static conditions.

These and other objects and advantages of the present invention will become apparent from a reading of the detailed description of the preferred embodiment taken in view of the accompanying drawings.

DESCRIPTION OF THE DRAWINGS

FIGS. 13–16 are schematic representations of the improved blocker-jaw clutch assembly of the present invention in various relative operational positions thereof.

DESCRIPTION OF THE PREFERRED EMBODIMENT

Referring now to the apparatus in detail, it will be recognized that a detailed disclosure of both the construction and operation of blockers and blocked transmissions utilizing same has been set forth and claimed in the above mentioned patents and reference is therefore made thereto for such details.

Figure 1:
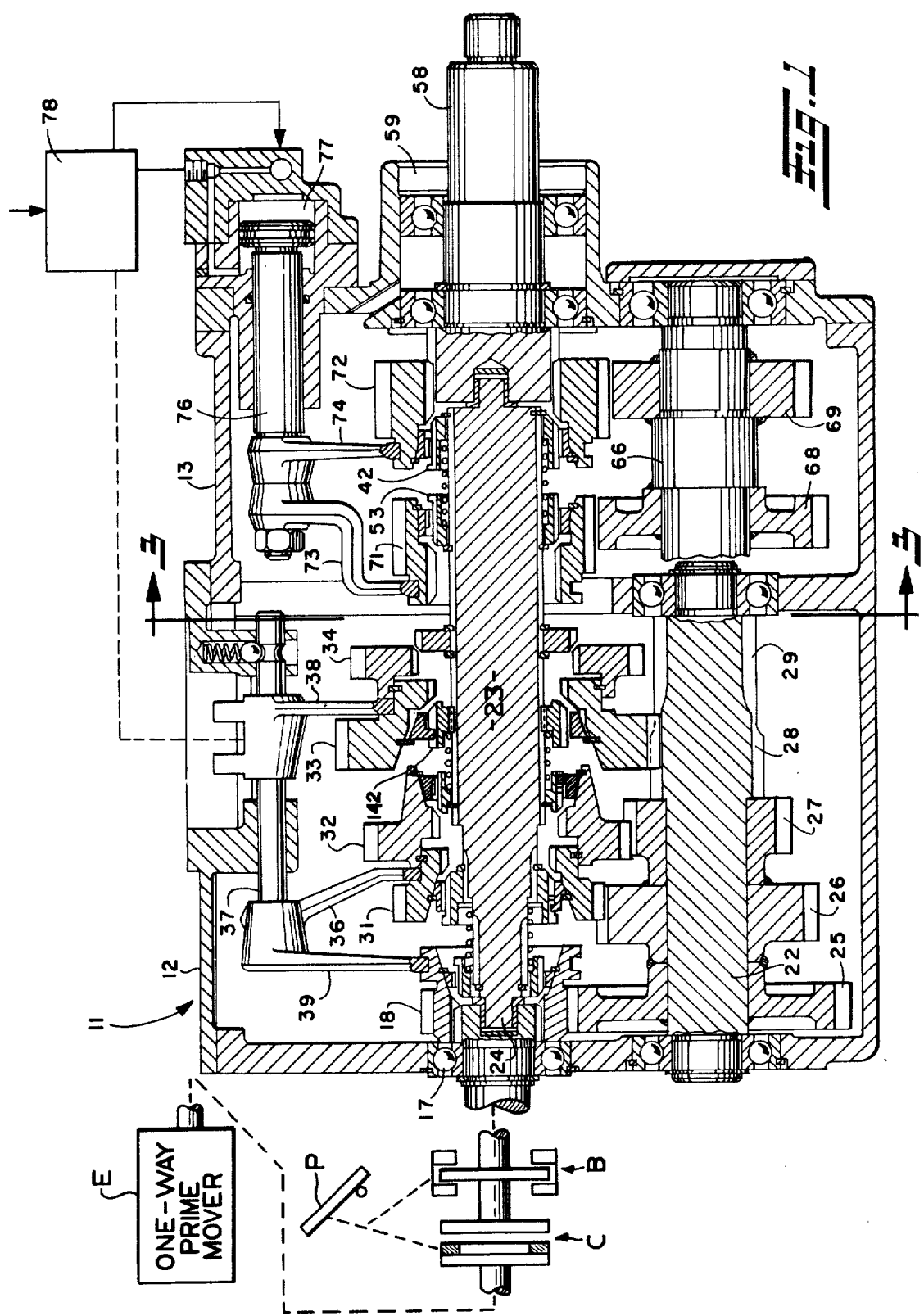
FIG. 1 is a cross-sectional view of the improved blocked transmission of the present invention utilizing improved blocker and jaw clutch assemblies in connection with the positive clutches associated with at least one axially interconnected set of main transmission section main shaft gears, and utilizing blockers of the type described in the prior art in connection with the positive clutches associated with many of the other speed ranges, the main transmission portion thereof being taken along the line I—I of FIG. 3 and the auxiliary transmission portion thereof being taken along the line I—IA of FIG. 3.
Figure 2:
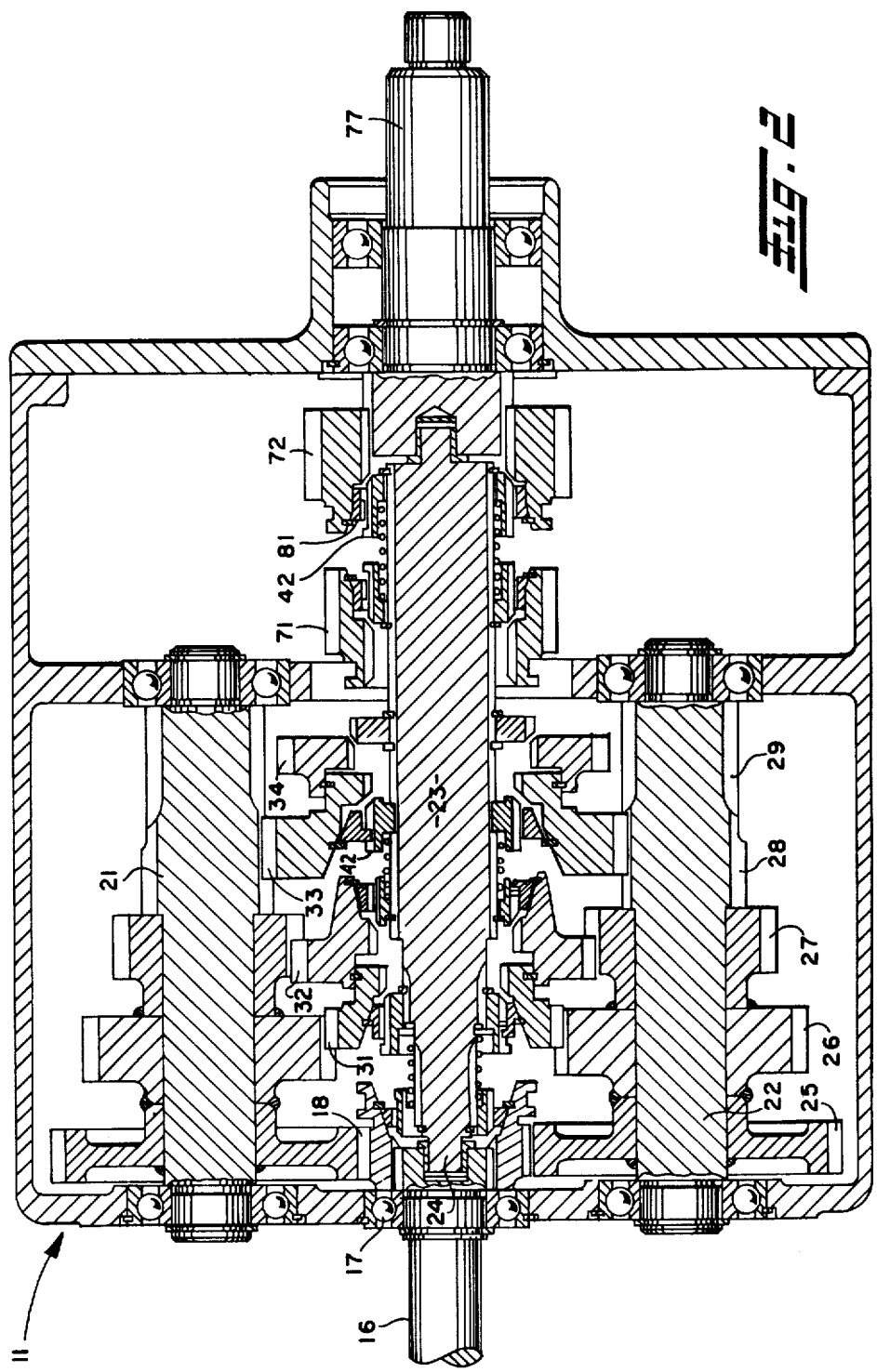
FIG. 2 is a cross-sectional view of said transmission taken substantially along the line II—II of FIG. 3.

Certain terminology will be used in the following description for convenience in reference only and will not be limiting. The words "upwardly", "downwardly", "rightwardly", and "leftwardly" will designate directions in the drawings to which reference is made. The words "forward" and "rearward" will refer respectively to the front and rear ends of the transmission as same is conventionally mounted in the vehicle, being respectively the left and right sides of the transmission as illustrated in FIG. 1. The words "inwardly" and "outwardly" will refer to directions toward and away from, respectively, the geometric center of the device and designated part thereof. Said terminology will include the words above specifically mentioned, derivatives thereof, and words of similar import.

The term "simple transmission" is used to designate a change speed transmission wherein the operator may select one of a plurality of single gear reductions. The term "compound transmission", is used to designate a transmission having a main transmission portion and an auxiliary transmission portion whereby the selected gear reduction in the main transmission portion may be compounded by further selected gear reduction in the auxiliary transmission portion. The term "splitter type compound transmission" as used herein will designate a compound transmission wherein the auxiliary transmission is used to provide various selectable steps of the gear ratio selected in the main transmission portion. The term "upshift" as used herein shall mean the shifting from a lower speed gear ratio to a higher speed gear ratio. The term "downshift" as used herein shall mean the shifting from a higher speed gear ratio to a lower speed gear ratio. The terms "low speed gear", "low gear" and/or "first gear" as used herein shall all designate the gear ratio utilized for lowest forward speed operation in a transmission, i.e., that set of gears having the highest ratio of reduction relative to the input shaft of the transmission.

The term "blocked transmission" shall designate a change gear transmission wherein a selected gear is non-rotatably coupled to a shaft by means of a positive clutch and a blocker is utilized to prevent such engagement until the members of the positive clutch are at synchronous, such synchronous condition achieved by manual and/or automatic manipulation of the transmission input and/or output shafts to cause the clutch members associated with said shafts to cross synchronous but not achieved by frictional contact of the selected clutch members sufficient to cause one of the clutch members, and the apparatus associated therewith, to rotate with the other clutch member.

The term "synchronized transmission" shall designate a change gear transmission wherein a selected gear is non-rotatably coupled to a shaft by means of a positive clutch, attempted engagement of said clutch is prevented until the members of the clutch are at synchronous and frictional means associated with clutch members are sufficient, upon initiation of a clutch engagement, to cause the clutch members, and all members rotating therewith, to rotate at a substantially synchronous speed of rotation.

The improved blocked transmission of the present invention is illustrated in connection with a resiliently shiftable change speed transmission of the type having a floating main shaft and a plurality of substantially identical countershafts as may be seen in more detail by reference to the above mentioned U.S. Pat. Nos. 3,799,002 and 3,924,484. Although the improved transmission and improved jaw clutch-blocker assembly of the present invention is illustrated in connection with such a resiliently shiftable change speed transmission, it is understood that the improved transmission of the present invention may utilize any type of positive clutch and is especially suited to utilize axially engageable jaw clutch structure.

Insofar as concerns the integration of the improved blocker and jaw clutch assembly of the present invention, and the blocker and jaw clutch assemblies of the prior art, into the entire shiftable change speed transmission system, the blockers are placed between the two relatively axially slidable portions, or members, of at least one and preferably most or all of the transmission positive clutches and the usual friction means are provided for causing the blockers to tend to rotate with one of said members as the clutch members respectively move toward each other during a clutching procedure. One of said clutch members is often formed integrally with a main shaft gear as internal clutch teeth thereof. As the clutching procedure occurs, the blocker limits such relative axial movement until substantial synchronization between the clutch members involved in a given shift is sensed.

As may be seen by reference to U.S. Pat. Nos. 3,921,469 and 3,924,484, both above mentioned, there may further be provided means by which a significant axial drag with a minimum of rotational drag is provided constantly between the blocker ring and the clutch member blocked thereby. Thus, said blocker rings will be axially urged upon axial movement of said last named clutch element into engagement with the driving cone of the other clutch element and will thereby be held in proper position against the effect of its own inertia with respect to the gear associated therewith. This assures that, in most operating situations, the blocker rings will be in the desired position prior to contact with the blocking surface of the clutch.

Both the prior art blocker-jaw clutch assembly and the improved blocker-jaw clutch assembly of the present invention contain advantageous features in that, for the blocking function thereof, there is required removal of only one portion of one first tooth of a clutch member and the blocker ring is provided with a first pair or set of teeth or projections extending toward the clutch element from which a part of said one first tooth has been removed. Said first teeth are of sufficient circumferential spacing to straddle the remaining portion of said one first tooth when synchronization is achieved for effecting an unblocking condition but at least one of said blocker teeth are themselves of circumferential dimension less than the spacing between the clutch teeth on said clutch element for permitting circumferential shifting thereof in at least one direction and the creation of a blocking condition. In the preferred embodiment, three first arrays of partially removed teeth and projections are utilized. The improved blocker and jaw clutch assemblies of the present invention, in addition to the above mentioned first arrays, require a second tooth extending from the blocker member and a second set of adjacent teeth on the clutch member having portions thereof removed and defining ramps inclined toward the space between the teeth of the second set of partially removed teeth. The second tooth will fit in the space between the remaining portions of the partially removed teeth of the second set of adjacent partially removed teeth when the remaining portion of the first tooth is aligned with the space between the teeth of the first set of teeth. Additional second arrays comprising a second tooth extending from the blocker and a second set of partially removed teeth extending from the clutch member may be provided as required.

Referring now to the drawings, there is illustrated a resiliently shiftable, change speed blocked transmission 11 having both a main transmission section 12 and an auxiliary transmission 13, each of which have a plurality of selectable ratios. The transmission illustrated is generally referred to in the art as a compound transmission and is of the splitter type of compound transmission. The main and auxiliary sections are both suitably enclosed by conventional housing means.

The blocked transmission 11 includes an input shaft 16 supported adjacent its rearward end by a bearing 17 and is provided with an input gear 18, nonrotatably connected thereto, as by splines. The input gear 18 simultaneously drives a plurality of countershafts at equal rotational speeds. In the illustrated embodiment, the transmission is provided with two countershafts, 21 and 22, disposed on diametrically opposite sides of the main shaft 23, which main shaft is coaxially aligned with the input shaft 16 and is provided with a pilot portion 24 on its forward end rotatably received within and supported by the rearward end of the input shaft 16.

The input shaft 16 is normally driven in one direction only by a prime mover, such as a Diesel engine E through a selectively operated, normally engaged, friction master clutch C. Clutch C may be disengaged by use of pedal P as is known in the prior art. The pedal P, when fully depressed, is effective to engage a normally disengaged input shaft brake B as is also well known in the prior art. Input shaft brake B may be replaced by any other type of normally disengaged input brake.

Each of the countershafts 21 and 22 is provided with an identical grouping of countershaft gears, 25, 26, 27, 28 and 29 thereon, which groupings form pairs of gears, such as the pair of gears 26, of identical size and number of teeth and disposed on diametrically opposite sides of main shaft 23.

A plurality of main shaft drive gears 31, 32, 33 and 34 encircle the main shaft and are selectively clutchable thereto one at a time by yieldable clutch mechanisms, as described in greater detail hereinafter and in the above incorporated patents.

The main shaft gears 31, 32 and 33, encircle the main shaft 23, are in continuous meshing engagement with, and are floatingly supported by the diametrically opposite pairs of countershaft gears 26, 27 and 28, respectively, which mounting means and the special advantages resulting therefrom are explained in greater detail in U.S. Pat. Nos. 3,105,395 and 3,335,616, both assigned to the assignee of this application and hereby incorporated by reference. The main shaft gear 34 is the reverse gear and is in continuous meshing engagement with a pair of countershaft gears 29 by means of conventional intermediate or idler gears (not shown). The forwardmost countershaft gears 25 are continually meshed with and driven by the input gear 18 for causing simultaneous rotation of the countershafts 21 and 22 whenever the input shaft is rotatably driven. As illustrated in FIG. 1, the input gear 18 is connected to a conventional shift fork 39, which shift fork is controlled by the shift rod 37 for permitting input gear 18 to be shifted axially for selectively permitting direct driving engagement between the input shaft 16 and the main shaft 23.

The main shaft gears 31 and 32 are axially interconnected to form a gear pair and are connected to a conventional shift fork 36. The position of the shift fork 36 being controlled in a conventional manner by means of appropriate shift rods similar to rod 37. The main shaft gear pair 31-32 is thus shiftable axially relative to main shaft 23 in response to axial shifting of the fork 36 by said rod. However, the gears 31 and 32 are independently rotatable relative to one another. The improved blocker and jaw clutch assemblies, 100 and 102, are utilized in connection with gears 31 and 32, respectively, and are described in greater detail below. In a similar manner, the main shaft gears 33 and 34 are also axially interconnected so as to be axially shiftable as a pair by means of the shift fork 38, which shift fork is also controlled by appropriate shift means. The main shaft gear pair 33-34 is likewise and similarly axially movable relative to the main shaft 23 and independently rotatable.

Figure 3:
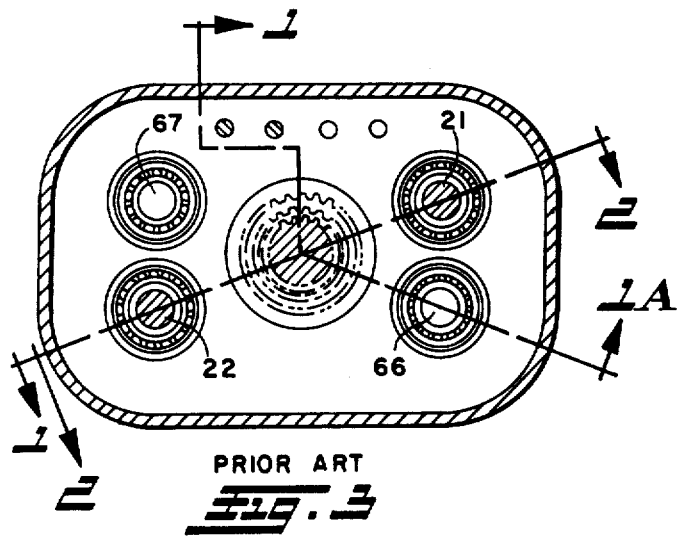
FIG. 3 is a sectional elevational view taken along the line III—III of FIG. 1.

Considering now the splitter auxiliary section 13, the main shaft 23 extends thereinto and is coaxially arranged with and piloted into an output shaft 58 which is in turn supported within the housing 13 by suitable bearings generally indicated at 59. Said auxiliary section further includes a plurality of countershafts 66 and 67 (FIG. 3) each having an identical grouping of countershaft gears thereon, of which two appear at 68 and 69 (FIG. 1). The first pair of countershaft gears 68 are disposed diametrically opposite and in continuous meshing engagement with the main shaft gear 71, which main shaft gear is floatingly supported by the forward pair of countershaft gears, one being the gear 68 for substantially consecutively encircling the main shaft 23. A further main shaft gear 72 is also floatingly and substantially consecutively supported relative to the main shaft 23 by the rearward pair of countershaft gears, one being the gear 69. Shift forks 73 and 74, respectively, are provided for effecting the shifting of gears 71 and 72 and said shift forks are operable by appropriate shift rods of which one appears at 76 for operation by any desired means such as the pressure cylinder 77. Appropriate control means 78, a presently known type, is provided for properly effecting and interrelating control of the shift means for the forward gears 18 and 31-34 and the splitter gears 71 and 72.

The yieldable clutch structures are arranged between the shiftable main shaft gears in both the main transmission and the auxiliary section and are provided with resilient means for urging engagement thereof as set forth in detail in the above mentioned U.S. Pat. Nos. 3,799,002 and 3,983,979. While clutch means utilizing relatively nondeformable blockers of the prior art are not identical with each other, they are generally similar and hence insofar as the present invention is concerned, it will be sufficient to describe only one of them in detail with the understanding that same may be applied to the other clutch units without difficulty by anyone skilled in the art. Therefore, for this purpose, referring to the positive jaw clutch unit positioned between the main shaft gear 72 and the main shaft 23 in the auxiliary transmission section, said jaw clutch unit is generally designated 41 and includes an annular clutch collar or clutch member 42 encircling the main shaft 23. The clutch collar 42 is provided with internal splines 43 which are disposed within corresponding external splines 44 provided on the main shaft 23 for interconnecting the clutch collar 42 to the main shaft 23 for rotation therebetween. However, the cooperating splines 43 and 44 permit the clutch collar 42 to freely slide axially relative to the shaft 23. A stop ring 46 is seated within a suitable groove formed on the external periphery of the shaft 23 and is disposed for contacting the clutch collar 42 and limiting the leftward axial movement thereof. The collar 42 is normally resiliently urged by means of a spring 47 into a butting engagement with the stop ring 46.

The clutch collar 42 is provided with external teeth 48 thereon which are adapted to meshingly engage the internal teeth 50 provided on one of the main shaft gears, such as gear 72, the internal teeth 50 forming the other member of clutch 41. The teeth 48 on the clutch collar 42 are tapered, as at 51, and in a similar manner the leading edge of the teeth 50 on the main shaft gear 72 are similarly tapered at 52. The tapered conical surfaces 51 and 52 each extend at an angle of preferably between 30° and 40° relative to the longitudinal axis of the main shaft 23. The exact degree of taper, and the advantages thereof, are explained in detail in U.S. Pat. No. 3,265,173. The other end of the spring 47 resiliently acts against a further clutch collar 53 (FIG. 1) which collar is identical to the collar 42 but is disposed so that it has the tapered leading ends of teeth facing in the opposite direction.

Further resilient, substantially identical, clutch assemblies are provided for the other shiftable gear sets but same are set forth in detail in the above incorporated patents and hence further description thereof is unnecessary here.

Figure 4:
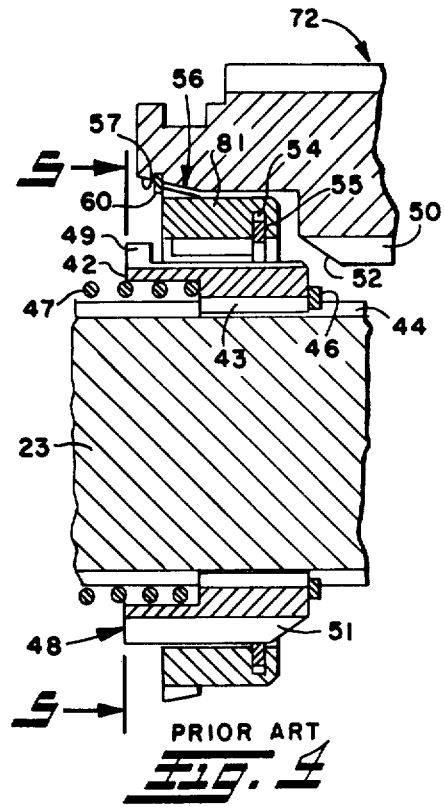
FIG. 4 is an enlarged fragmentary view of the jaw clutch structure utilized in connection with prior art blockers.
Figure 5:
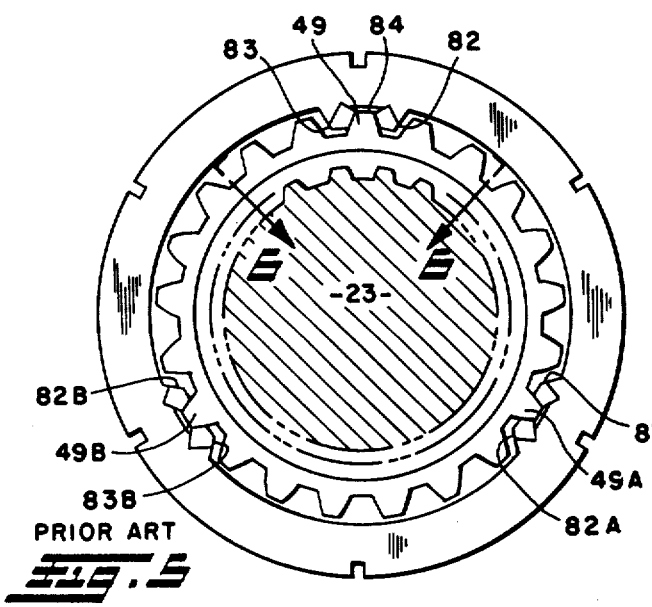
FIG. 5 is a sectional view of a prior art jaw clutch and blocker structure.
Figure 6:
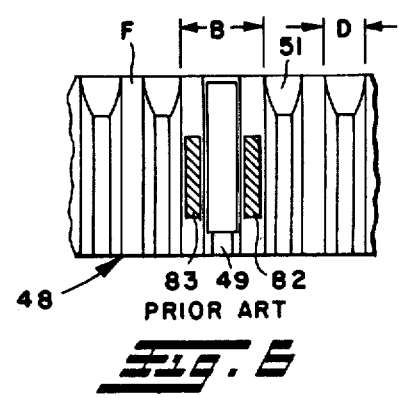
FIG. 6 shows the components of the prior art blocker fragmentarily in synchronous condition permitting shifting.
Figure 7:
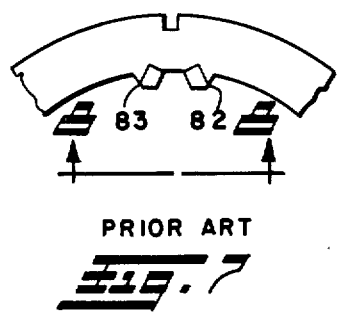
FIG. 7 is an enlarged fragmentary detail of the prior art blocker ring teeth taken from the same direction as shown in FIG. 5.
Figure 8:
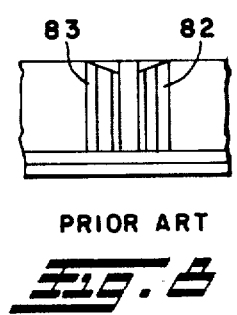
FIG. 8 is a view taken in the direction of the arrows VIII—VIII in FIG. 7.
Figure 9:
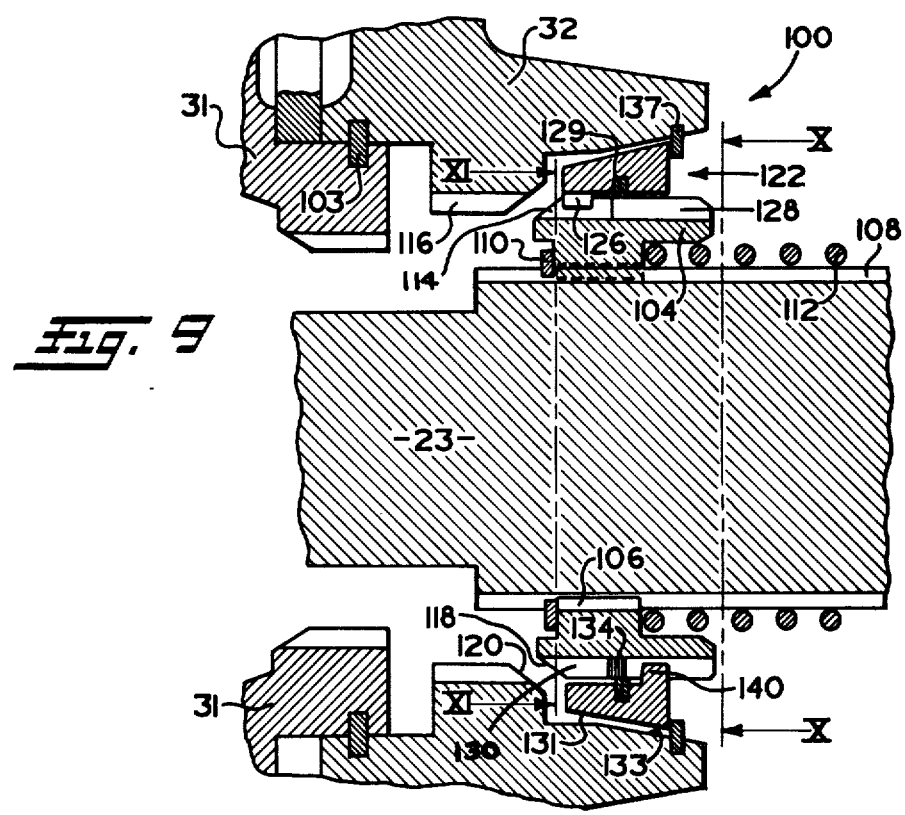
FIG. 9 is an enlarged fragmentary view of the improved blocker and jaw clutch assembly of the present invention taken along the line IX—IX of FIG. 10.

Referring to FIG. 4, a portion of each of a selected number, here three, of the teeth 48 are partially removed for permitting the presence of a blocking ring as hereinafter further described. Such partial removal leaves, however, a shortened tooth 49 for cooperation with the blocking ring.

Referring now to the relatively nondeformable prior art blockers, which are illustrated in FIGS. 5 through 8, one thereof is indicated generally at 81, and comprises a ring encircling the clutch member 42 and has an appropriate number, here three pairs, of radially inward projections 82 and 83, which when properly positioned will mate with the external teeth above mentioned. The inward projections or teeth 82 and 83 are contoured at their sides to lie snugly against the adjacent ones of the teeth 48 and are positioned to project into the spaces between a partially removed tooth 49 and the teeth 48 on each side thereof. Blocker ring 81 is thus splined to clutch member 42 for rotation therewith. Each pair of teeth 82 and 83 are circumferentially of less dimension than the corresponding circumferential spaces defined by the teeth immediately adjacent the partially removed teeth 49 and thus blocker ring 81 may be rotated in either a limited clockwise or counterclockwise direction relative to clutch member 42 from the position seen in FIG. 5 in which the space between teeth 82 and 83 aligns with partially removed tooth 49. Contact of either blocker tooth 82 or 83 by a clutch tooth 48 will limit such relative rotation and cause blocker 81 to rotate with clutch member 42. The space between the inwardly projecting teeth 82 and 83 is of a clearance distance wider than the corresponding circumferential dimension of the tooth 49 so that when properly aligned at synchronism (or more accurately, when the relative speeds of the clutch components cross synchronism) the teeth 82 and 83 will straddle the tooth 49 and the clutch member 42 can move axially through but not past blocker ring 81 to effect engagement with its corresponding clutch member integrally formed in a corresponding gear. As may be seen by reference to FIG. 8, the end faces of the blocker teeth 82 and 83 may be tapered.

As is described in greater detail by reference to U.S. Pat. Nos. 3,921,469 and 3,924,484, the radially inner side of ring 81 may be provided with an inwardly directed groove 54 which receives an annular resilient ring 55 which is normally of slightly less internal diameter than the external diameter of the teeth 48 so that when the parts are in the assembled condition, ring 55 is distorted slightly outwardly thereby to exert a light but definite pressure against the external surface of said teeth 48. Inasmuch as the ring 55 fits loosely and only in light frictional contact with the walls of the groove 54, this effects a significant resistance to axial movement between the blocker ring 81 and the clutch ring 42 but only an insignificant resistance to relative rotative movement therebetween.

A suitable conical surface 56 projects radially outwardly from the blocker ring 81 and is positioned for engagement with a similar conical surface 57 on a radially inner wall of the gear 72. The axial drive above mentioned is sufficient that the rotative driving effect of the surface 57 onto the blocker 81 is much greater than whatever rotative resistance may exist between the blocker 81 and the clutch member 42. A stop ring 60 limits movement of the blocker 81 away from the conical surface 57 when the clutch ring 42 moves out of engagement (leftwardly in FIG. 4). Blocker ring 81 will, with a certain amount of axial freedom, move axially with gear 72 and clutch member 50 integral with gear 72 as a result of contact with either surface 57 or ring 60.

The other two partially removed teeth corresponding to tooth 49 are indicated at 49A and 49B and internally extending teeth on the blocker ring corresponding to the teeth 82 and 83 are indicated at 82A and 83A for cooperation with the partial tooth 49A and at 82B and 83B for cooperation with the partial tooth 49B.

The operation of the blocker 41 is generally similar to that of known generally nondeformable blockers, and in particular is substantially identical to those nondeformable blockers described in U.S. Pat. No. 3,924,484. For example, assuming the gear 72 is rotating more rapidly than the clutch member 42, which, of course, rotates at the same speed as the main shaft 23, the blocker 81 will normally (ignoring for the moment the effect of the ring 55) tend to rotate with the gear 72, hence, lead the clutch member 42 and position the teeth 83, 83A, and 83B, in a position to interfere with the partial teeth 49, 49A, and 49B, respectively, to prevent axial clutching movement of the clutch component to the right. However, as the shaft 23 accelerates and a condition of synchronism is approached, the space between the inwardly projecting blocker teeth will become substantially centered with the partial teeth on the periphery of the clutch member 42 and upon reversal of the relative speeds, the blockers will no longer block and the clutch member 42 will move into clutching engagement in the usual manner.

With the gear 72 initially running slower than the shaft 23, the operation will be generally similar to that described above excepting that the blocker 81 will lag behind the clutch member 42 until there occurs a reversal of relative speeds, i.e., a passing through synchronous, at which time blocking will cease and clutching will again be completed in a manner already well known for blocking devices.

Considering now the effect of the compression or drag ring 55, it will be recognized that when there is no appreciable axial pressure rightwardly, as appearing in FIG. 4, on the blocker ring 81, there will be no appreciable friction between the conical surfaces 56 and 57 and hence no tendency for the blocker ring 81 to rotate with the gear 72. However, as the clutch member 42 commences to move axially rightwardly, the axial drag provided by the drag ring 55 urges the blocking ring 81 likewise axially to effect interengagement between the friction surfaces 56 and 57. Since the rotative driving force of the surface 57 onto the blocker ring is greater than the rotative resistance between the blocker ring and the clutch ring, the blocking ring 81 commences rotating with the gear 72 and does so prior to contact between the teeth of the blocker 81 and teeth of the clutch member 42.

Blocked transmissions, such as transmission 11 described above, utilizing substantially nondeformable blockers which are operable to block or permit a jaw clutch engagement dependent upon the rotative position of the blocker relative to one of the jaw clutch members are a considerable improvement over prior art devices. However, such blocked transmissions have inherently required auxiliary mechanism and/or operational procedures to achieve satisfactory gear engagement when the transmission is to be shifted from neutral into a drive gear when the vehicle driven by the transmission is at rest.

Figure 10:
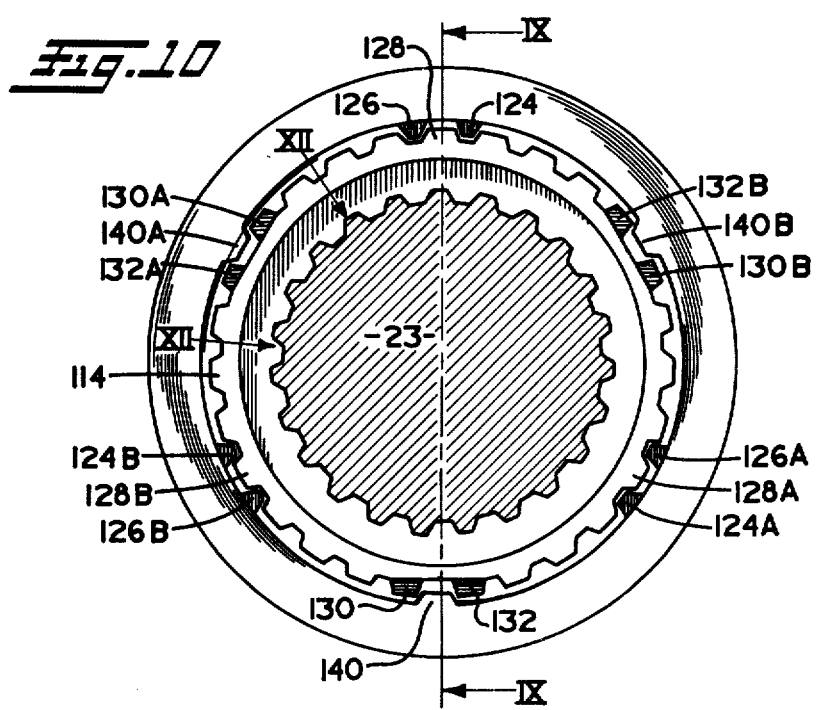
FIG. 10 is a sectional view of the improved blocker and jaw clutch member assembly of the present invention taken along the line X—X in FIG. 9.
Figure 11:
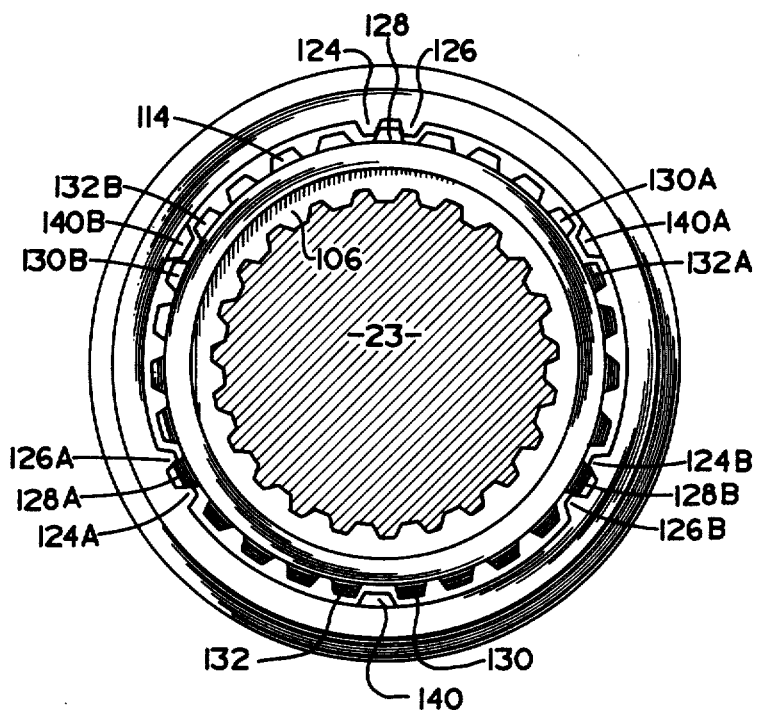
FIG. 11 is a sectional view of the improved blocker and jaw clutch member assembly of the present invention taken along the line XI—XI in FIG. 9.

As a blocked transmission is placed in neutral with the driven vehicle stopped, motion of the gearing and random frictional contact between the gearing and the blockers will usually tend to place the blockers in the upshifting position. Thus, for example, if the gear 32 and main shaft 23 are rotating in a counterclockwise direction as seen in FIG. 10, the blocker ring associated with gear 32 would be rotated counterclockwise relative to clutch member on which it is carried. To achieve a crossing of synchronous, the gear 32, which the blocker ring will tend to rotate with, must be caused to rotate clockwise relative to the main shaft 23. Such a relative rotation will occur only if the main shaft is rotated faster than the gearing or if the input shaft and gearing is rotated in the reverse (clockwise) direction. As, at neutral, it is difficult or impossible to rotate a simple transmission output shaft or a compound splitter transmission mainshaft faster than the input shaft and gearing, a means for selectively and/or automatically positively reverse rotating the input shaft 16 and gearing driven thereby or a means to bring the blocker and associated jaw clutch member into alignment is required. The improved blocker and jaw clutch assembly of the present invention is provided to selectively align the blocker and jaw clutches when the transmission is in neutral with the driven device at rest.

The improved blocker and jaw clutch assembly 100 of the present invention is illustrated in detail in FIGS. 9–12 and the operation thereof is schematically illustrated in FIGS. 13–16.

The improved blocker and jaw clutch assembly 100 is illustrated as utilized with the main transmission section second speed main shaft ratio gear 32 for selectively engaging gear 32 to the main shaft 23. Preferably, a similar assembly 102 is also utilized in connection with at least the main transmission section third speed main shaft ratio gear 31 for selectively engaging gear 31 to the main shaft. As has been indicated above, gears 31 and 32 are an axially interconnected pair of gears which will move together axially to the left for engagement of gear 31 and axially to the right for engagement of gear 32. Gears 31 and 32 are axially interconnected by stop ring 103 or the like.

Referring to FIGS. 9–12, a yieldable positive clutch unit, namely that positioned between the second speed main transmission section main shaft gear 32 and the main shaft 23 is illustrated. The clutch unit comprising a first annular jaw clutch member or collar, 104, encircling the main shaft 23. The first clutch member 104 is provided with internal splines 106 which are disposed within external splines 108 provided on the main shaft for rotationally interconnecting the first clutch member 104 to the main shaft. Cooperating splines 106 and 108 allow the first clutch member 104 to freely slide axially relative to the mainshaft. A stop ring 110 is seated within a groove formed on the exterior periphery of main shaft 23 for contacting first clutch member 104 and limiting the leftward axial movement thereof. The first clutch member 104 is resiliently urged by spring 112 to the left into butting engagement with the stop ring 110.

The first clutch member 104 is provided with external clutch teeth 114 which are adapted to meshingly engage the internal clutch teeth 116 provided on the gear 32. Teeth 116 on the gear 32 comprise the second clutch member of the jaw clutch for engaging gear 32 to shaft 23. Clutch teeth 114 and 116 may be tapered as at 118 and 120 respectively as is well known in the prior art.

The blocker 122 of the improved blocker-jaw clutch assembly 100 is a generally nondeformable ring encircling the first clutch member 104 and has an appropriate number, here three pairs, of radially inwardly extending spaced projections or teeth, 124 and 126, which when properly positioned will mate with the external teeth above mentioned. The radially inwardly extending projections or teeth 124 and 126 are contoured at their sides to lie snugly against adjacent ones of the teeth 114 and are positioned to project into the spaces between the teeth 114 immediately adjacent the partially removed tooth 128 on each side thereof. The projections, 124 and 126, and the spaces between the teeth 114 immediately adjacent the partially removed teeth 128 define a splined connection whereby the blocker ring 122 is rotationally carried by the clutch member 104 with a limited, predetermined degree of relative rotation therebetween. The projections, 124 and 126, will interact with the partially removed teeth 128 in substantially the same manner as previously described teeth 82 and 83 interact with partially removed teeth 49 so that when properly aligned at synchronism (or, more accurately, when the relative speed of the clutch components cross synchronism) the projections 124 and 126 will straddle the partially removed tooth 128 and the first clutch member 104 can move axially through but not past the blocker ring 122 to effect engagement with second clutch member 116 formed integrally with gear 32.

The relative rotational freedom permitted between blocker 122 and clutch member 104 is sufficient to allow both alignment and misalignment of partially removed tooth 128 with the space between projections 124 and 126. An annular resilient ring 134 may be provided in an inwardly directed groove for the same reason as the resilient ring 55 is utilized in connection with blocker 81 described above.

A suitable conical surface 131 projects radially outwardly from the blocker ring 122 and is positioned for engagement with a similar conical surface 133 on a radially inner wall of gear 32. A stop ring 137 limits movement of the blocker 122 away from the conical surface 133 when the first clutch member 104 moves out of engagement (rightwardly in FIG. 9). Blocker ring 122 will, with a small amount of axial freedom, move axially with gear 32.

The other two partially removed teeth corresponding to the removed tooth 128 are indicated at 128A and 128B and internally extending teeth on the blocker ring corresponding to the teeth 124 and 126 are indicated at 124A and 126A for cooperation with the partial teeth 128A and as 124B and 126B for cooperation with the partial tooth 128B.

The blocking operation of the improved blocker and jaw clutch assembly 100 is substantially identical to that described above in connection to the blocker 81. The improved blocker and jaw clutch assembly 100, in addition to providing the blocking function, also provides the additional function of selectively aligning the space between projections 124 and 126 with the partially removed teeth 128 when the transmission is in neutral and the driven device is at rest.

At the axial end of first clutch member 104 opposite the end from which the partially removed tooth 128 extends, i.e., the left end, a second pair of adjacent projections or partially removed teeth, 130 and 132, extend radially outwardly. The second set of projections, 130 and 132, comprise circumferentially adjacent partially removed teeth of the clutch member 104. The partially removed adjacent teeth 130 and 132 each include a leading portion, 134 and 136, closest the removed portions thereof which are sharply inclined inwardly toward the space 138 between the teeth 130 and 132 in the direction away from the removed portions of the teeth. The blocker 122 includes a radially inwardly extending second tooth 140 on the axial end thereof opposite the end from which projections 124 and 126 extend, i.e., the right hand end. The second tooth 140 is sized to closely fit in and pass through the space 138 between the second set of adjacent projections or partially removed teeth, 130 and 132. The second set of adjacent projections, 130 and 132, and the second tooth 140 are arranged such that when tooth 140 is in the space 138 between the second set of adjacent projections, 130 and 132, the first partially removed tooth 118 will be aligned with the space between the first set of projections 124 and 126.

Figure 12:
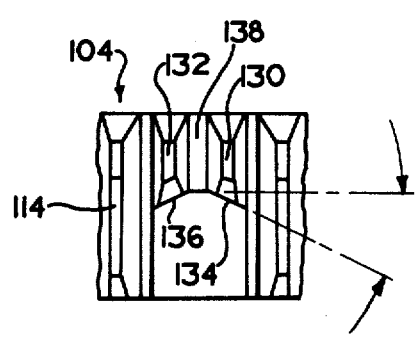
FIG. 12 is an enlarged fragmentary view taken in the direction of arrows XII—XII in FIG. 11.

The inclined surfaces 134 and 136 of partially removed teeth 130 and 132 are sharply inclined inward as may be seen by reference to FIG. 12 and will cause, or tend to cause, the blocker 122 to rotate relative to first clutch member 104 sufficiently to align the tooth 140 with the space 138 when the tooth 140 and surface 134 or 136 are urged axially together under pressure. As blocker 122 moves axially with mainshaft gear 32, the tooth 140 will be urged into contact with surfaces 134 and/or 136 when the first and second jaw clutch members, 104 and 116 respectively, are axially separated. Thus, as gears 31 and 32 are moved to the left, stop ring 137 will cause blocker 122 to move to the left with gear 32 causing tooth 140 to contact surface 134 or 136 to align the first partially removed tooth 128 with the space between projections 124 and 126.

Two other second sets of partially removed teeth, 130A and 132A, and 130B and 132B, are illustrated for cooperation with two additional second teeth 140A and 140B, respectively. Preferably, the second sets of partially removed teeth are equally circumferentially spaced about the first clutch member 104 and are located circumferentially equidistant between the partially removed teeth 128, 128A and 128B.

The alignment, or selective self-alignment, function of the improved blocker-jaw clutch assemblies of the present invention may be seen by reference to FIGS. 13–16.

In FIGS. 13–16, an improved blocker-jaw clutch assembly 200 is schematically illustrated in a flattened embodiment. The assembly 200 includes a first clutch member 204 which, for illustrative purposes, is shown as fixed, and a blocker 222. The blocker 222 is movable in the right-left direction (corresponding schematically to axial movement of blocker 222 relative to main shaft 23) and the up-down direction (corresponding schematically to rotation of blocker 122 relative to clutch member 104. The clutch member 204 includes clutch teeth 214 which, upon sufficient rightward movement of the clutch member, will engage clutch teeth on a second clutch member, not shown.

The blocker 222 includes a first pair of projections or teeth 224 and 226 extending from the blocker toward the member 204 from the right end of the blocker and a second tooth 240 extending from the blocker towards the member 204 from the left end of the blocker. The member 204 includes a first partially removed tooth 228 extending from the member toward the blocker from the left end of the member and a pair of second set of adjacent partially removed teeth, 230 and 232, extending from the member toward the blocker from the right end of the blocker.

The first projections 224 and 226 will contact the first partially removed tooth 228 and prevent rightward movement of member 204 if the first partially removed tooth is not aligned with the space between first projections 224 and 226. Second partially removed teeth, 230 and 232, include inclined leading edges, 234 and 236, inclined toward the space 238 between the partially removed teeth. The projections and teeth are arranged such that partially removed tooth 228 will align with the space between projections 224 and 226 of the first set of projections when projection 240 is in, or aligned with, the space 238 between partially removed teeth 230 and 232 of the second set of partially removed teeth. Axial contact of tooth 240 with leading edge 234 or 236 will cause, or tend to cause, upward or downward movement of blocker 222 sufficient to place tooth 240 in alignment with space 238.

FIG. 14 illustrates a relative position of blocker 222 and clutch member 204 wherein rightward movement of clutch member 204 is prevented, or blocked, by the contact of first partially removed tooth 228 with projection 226 of the first set of projections. This generally corresponds to a blocked clutch engagement of a blocked transmission such as transmission 11.

FIG. 15 illustrates the aligning, or selective self-aligning, function of blocker-jaw clutch assembly 200. Movement of the blocker 222 to the right has caused second projection or tooth 240 to engage the leading edge 234 of partially removed tooth 230 under pressure and thereby caused downward movement of blocker 222 sufficient to result in tooth 240 entering space 238 between the partially removed teeth 230 and 232, thus aligning first partially removed teeth 228 with the space between projections 224 and 226. If the first clutch member 204 and blocker 222 are maintained in this relative position (this is the function of the input shaft brake B in transmission 11) an engagement of clutch member 204 with the corresponding clutch member may be achieved by a simple rightward movement of member 204 as is illustrated in FIG. 16.

In operation, assuming the blocked transmission 11 of the present invention is in neutral with the driven device at rest and the blockers in the normally assumed "upshift position", if the operator wishes to engage the main transmission section second speed gear, gear 32, the operator would, with the input shaft brake engaged, simply shift toward the third speed gear 31 and then back toward the desired gear 32. As gears 31 and 32 are an axially joined pair, shifting toward gear 31 will cause gear 32 and blocker 122, which will move axially with gear 32, away from first clutch member 104. This will cause the second tooth or projection 140 to engage one of the inclined edges, 134 or 136, of the second set of partially removed teeth, 130 and 132, to cause the projection 140 to enter the space 138 between the teeth of the second set of partially removed teeth, thus aligning the first partially removed tooth 128 with the space between the projections 124 and 126 of the first set of projections. The input shaft brake B will help to retain the alignment as the gear 32 is moved to the left to cause the first clutch member to pass through the blocker and into engagement with the second clutch member.

While the specific embodiment of the invention has been set forth herein for illustrative purposes, it is understood that the present disclosure of the preferred form has been made only by way of example and that numerous changes and the details of construction and combination and arrangement of the parts may be resorted to without departing from the spirit and the scope of the invention as hereinafter claimed.

We claim:

1. An improved blocker and jaw clutch assembly of the type comprising a substantially non-deformable blocker ring splined to a first of two axially engageable positive clutch members for rotation therewith with a predetermined relative rotation therebetween, said blocker ring operable to tend to rotate with said second clutch member at initiation of a clutch engaging operation, said blocker ring and first clutch member each having first projections extending therefrom defining a first array of interacting projections, said first array of projections effective to block relative axial movement of said first clutch member toward said second clutch member if not aligned, said blocker ring having at least one rotational position relative to said first clutch member wherein said first array of projections are aligned and at least one rotational position relative to said first clutch member wherein said first array of projections are misaligned, said blocker effective to sense non-synchronous rotation of said clutch members corresponding to blocker rotation relative to said first clutch member sufficient to cause a misalignment of said first array of projections to block axial engagement of said clutch members, the improvement comprising:

selectively actuated means associated with said blocker ring and said first clutch member effective to cause alignment of said first array of projections upon axial separation of said clutch members.

2. The improved blocker and jaw clutch assembly of claim 1 wherein said first array of projections comprises a first set of adjacent projections extending from one of said blocker ring and first clutch member toward other of said blocker ring and first clutch member and a first tooth extending from the other of said blocker ring and first clutch member toward said one of said blocker ring and first clutch member, said first tooth sized to fit in the space between the projections of said first set of adjacent projections when aligned therewith.

3. The improved blocker and jaw clutch assembly of claim 2 wherein said means comprises a second array of projections extending from said blocker ring and said first clutch member.

4. The improved blocker and jaw clutch assembly of claim 3 wherein said blocker ring is axially movable with said second clutch member with a limited amount of axial freedom therebetween.

5. The improved blocker and jaw clutch assembly of claim 3 wherein said blocker ring surrounds said first clutch member, said first clutch member comprises a plurality of radially outwardly extending teeth, said first set of adjacent projections extends radially inwardly from said blocker ring toward said first clutch member, said first tooth comprises a first partially removed tooth extending from said clutch member, and said second array comprises a second tooth extending radially inwardly from said blocker toward said clutch member and a second set of adjacent partially removed teeth extending radially outwardly from said clutch member toward said blocker, said second tooth sized to fit in the space between the partially removed teeth of said second set of adjacent partially removed teeth, said first partially removed tooth aligned with the space between the projections of the first set of projections when said second tooth is in the space between the partially removed teeth of the second set of adjacent partially removed teeth.

6. The improved blocker and jaw clutch assembly of claim 5 wherein said first partially removed tooth and said second set of partially removed teeth extend from opposite axial ends of said clutch member, said first set of adjacent projections and said second tooth extend from opposite axial ends of said blocker ring and said first partially removed tooth and said second tooth extend from the axial end of said first clutch member and blocker ring, respectively, most distant from the second clutch member.

7. The improved blocker and jaw clutch assembly of claim 6 wherein at least one partially removed tooth of said second set of partially removed teeth includes a leading edge inclined toward the space between the partially removed teeth of the second set of partially removed teeth in the direction toward the second clutch member, contact with said leading edge by said second tooth under pressure tending to cause relative rotation of said blocker ring and first clutch member sufficient to cause said second tooth to enter the space between the partially removed teeth of the second set of partially removed teeth.

8. The assembly of claim 7 wherein said first and second clutch members are resiliently urged together.

9. The assembly of claim 7 wherein said blocker ring is axially carried by said second clutch member for axial movement therewith with a predetermined limited amount of axial movement therebetween.

10. An improved blocker and clutch assembly of the type comprising a substantially nondeformable blocker ring splined to a first of two axially engageable positive clutch members, said first clutch member comprising at least one first partially removed tooth extending generally radially toward said blocker ring and said blocker ring comprising at least one first pair of spaced projections extending generally radially toward said first clutch member, said first pair of projections having a circumferential dimension smaller than the circumferential space defined by the teeth immediately adjacent said first partially removed tooth, said first pair of projections received in the space defined by the teeth immediately adjacent said first partially removed tooth whereby said blocker ring has a predetermined limited degree of rotation relative to said first clutch member, said blocker ring tending to rotate with the second clutch member at the initiation of a clutch engaging operation, the space between the projections of said first pair of projections sufficient to permit passage of said first partially removed tooth when aligned therewith, said blocker ring effective to sense nonsynchronous rotation of said clutch members corresponding to blocker ring rotation relative to said first clutch member sufficient to cause said first partially removed tooth not to align the space between the projections of the first set of projections to block relative axial engagement of said clutch members, the improvement comprising:

means effective upon an axial separation of said clutch members to cause said first partially removed tooth to align with the space between the projections of said first set of projections.

11. The assembly of claim 10 wherein said means comprises a second tooth extending from said blocker ring toward said clutch member and a second set of adjacent partially removed teeth extending from said clutch member toward said blocker ring, said second tooth adapted to fit in the space between the partially removed teeth of said second set of adjacent partially removed teeth, said first partially removed tooth aligned with the space between the projections of the first set of projections when said second tooth is in the space between the partially removed teeth of the second set of adjacent partially removed teeth.

12. The assembly of claim 11 wherein said first partially removed tooth and said second set of partially removed teeth extend from opposite axial ends of said clutch member and said first set of projections and said second tooth extends from opposite axial ends of said blocker ring, said first partially removed tooth and said second tooth extend from the end of said clutch member and blocker ring, respectively, most distant the second clutch member, at least one partially removed tooth of said second set of partially removed teeth includes a leading edge inclined toward the space between the partially removed teeth of the second set of partially removed teeth in the direction toward the second clutch member, contact with said leading edge by said second tooth under pressure tending to cause relative rotation of said blocker ring and first clutch member sufficient to cause said second tooth to enter the space between the partially removed teeth of the second set of partially removed teeth.

13. The assembly of claim 12 wherein said blocker ring is axially carried by said second clutch member for axial movement therewith with a predetermined limited amount of relative axial movement therebetween.

14. An improved interengageable jaw clutch system of the type comprising a first rotatable means and a first jaw clutch portion mounted thereon for axial sliding relationship therewith and positive rotation therewith, a second rotatable means coaxially related to said first means and a second jaw clutch portion arranged thereon for interengagement with the first jaw clutch portion upon relative axial movement of said jaw clutch portions toward one another, one of said jaw clutch portions having drive teeth at a radius suitable for engaging with clutch teeth on the other jaw clutch portion, said one jaw clutch portion having also blocking teeth, said blocking teeth having a leading portion and a trailing portion, said trailing portion extending radially beyond said leading portion, blocker means coacting between said first and second jaw clutch portions for positively preventing engagement of said jaw clutch portions so long as a substantial difference in the relative speed is sensed therebetween, said blocker means including an annular substantially nondeformable blocker ring having at least one pair of blocking portions arranged thereon and supported by said drive teeth for limited rotation with respect thereto and positioned axially between said blocking teeth and said clutch teeth when said jaw clutch portions are disengaged, said pair of blocking portions being provided with a space therebetween capable of receiving therein said blocking teeth trailing portion when said blocking teeth and said spaces are aligned to permit said blocking teeth to move relatively axially past said pair of blocking portions so that said jaw clutch portions can be engaged with one another, and a surface on said blocker ring frictionally cooperating with the surface on said second jaw clutch portion for causing said blocker ring to tend to rotate with said second jaw clutch portion, the improvement comprising:

means associated with said first clutch portion and said blocker ring effective upon axial separation of said jaw clutch portions to tend to rotate said blocker ring relative to said first clutch portion sufficiently to align said blocking teeth with the spaces between said blocking portions.

15. The assembly of claim 14 wherein said blocker ring will move axially with said second clutch portion with a predetermined limited relative axial movement therebetween.

16. An improved, change gear, blocked transmission having an input shaft rotatably driven by a one-way prime mover through a normally engaged selectively disengageable friction master clutch, input gearing meshingly engaged with the input shaft, output means selectively engageable to said input gearing by jaw clutches comprising first and second axially engageable jaw clutch members, a relatively nondeformable blocker for blocking engagement of at least one of said jaw clutches when the jaw clutch members thereof are at nonsynchronous rotation, said blocker splined to a first jaw clutch member with a limited predetermined degree of relative rotational freedom, said blocker having at least one rotational position relative to said first jaw clutch member wherein said blocker is aligned with said first jaw clutch member and at least one rotational position relative to said first jaw clutch member wherein said blocker is in a position of non-alignment with said first jaw clutch member, said blocker effective to block engagement of said jaw clutch when rotated to a position of non-alignment relative to said first jaw clutch member, the improvement comprising:

means associated with at least one of said blockers effective upon an axial separation of said jaw clutch members associated with said one of said blocker when said master clutch is disengaged to cause said blocker to be rotated relative to said first jaw clutch member to a position of alignment relative to said first jaw clutch member.

17. The improved transmission of claim 16 wherein said transmission includes a selectively engageable, normally disengaged, input brake.

18. The transmission of claim 17 wherein said blocker is axially connected to said second clutch member with a predetermined limited degree of relative axial movement therebetween.

19. The improved transmission of claim 18 wherein said means is independent of said input shaft and input gearing.

20. The transmission of claim 18 wherein said blocker surrounds said first clutch member, said first clutch member comprises a plurality of radially outwardly extending teeth, said blocker and first clutch member defining a first array of projections comprising a first set of adjacent projections extending radially inwardly from said blocker toward said first clutch member and a first partially removed tooth extending radially outwardly from said first clutch member toward said blocker and a second array of projections comprising a second tooth extending radially inwardly from said blocker toward said first clutch member and a second set of adjacent partially removed teeth extending radially outwardly from said first clutch member toward said blocker, said second tooth adapted to fit in the space between the partially removed teeth of the said second set of adjacent partially removed teeth, said first partially removed tooth aligned with the space between the projections of the first set of adjacent projections when said second tooth is in the space between the partially removed teeth of the second set of adjacent partially removed teeth.

21. The transmission of claim 20 wherein said first partially removed tooth and said second set of partially removed teeth extend from opposite axial ends of said one clutch member and said first set of projections and said second tooth extends from opposite ends of said blocker, said first partially removed tooth and said second tooth extend from the end of said one clutch member and blocker respectively most distant the other clutch member, at least one partially removed tooth of said second set of partially removed teeth includes a leading edge inclined toward the space between the partially removed teeth of the second set of partially removed teeth in the direction toward the second clutch member, contact with said leading edge by said second tooth under pressure tending to cause relative rotation of said blocker and one clutch member sufficient to cause said second tooth to enter the space between the partially removed teeth of the second set of partially removed teeth.

22. An improved shiftable change speed simple transmission including a main shaft and at least one countershaft, multiple pairs of shiftable ratio gears arranged between said main shaft and said countershaft, with jaw clutch devices comprising first and second jaw clutch elements for connecting at least one of at least some of said pairs of gears to one of said shafts, said jaw clutches including at least one resiliently loaded jaw clutch element being constantly resiliently urged toward engagement position with the other jaw clutch element and positively limited in its response to said urging, blocker means provided on at least some of said jaw clutches for preventing engagement thereof in the event of a sensed non-synchronous condition comprising said blocker rotated relative to said first jaw clutch element to a position not in alignment with said first jaw clutch element, the improvement comprising:
means effective upon a separation of said jaw clutch elements to rotate said blocker relative to said first jaw clutch element to a position of alignment with said first jaw clutch element.

23. An improved change gear system comprising:
a housing, at least two spaced countershafts having parallel axes and mounted for rotation within said housing, a plurality of groups of gears on said countershafts, each group being comprised of substantially identical countershaft gears on said countershafts, means for supplying one way input power through a normally engaged, selectively disengageable master friction clutch to each of said countershafts, a normally disengaged selective engageable input brake, a driven gear drivable from each group of said countershaft gears, output means for said transmission, means supporting said output means for movement with respect to said countershafts in a direction substantially perpendicular to the plane including a pair of countershaft axes, means for selectively clutching said output means to one of said driven gears for selectively establishing a driving relationship from said countershafts through one group of countershaft gears, thence to and through the driven gear drivable from said one group for effective driving of said output means, said means for selectively clutching including axially engageable jaw clutches, said jaw clutches comprising first and second axially engageable jaw clutch members, at least one of said jaw clutch elements being constantly resiliently urged axially toward said other jaw clutch element, said one jaw clutch element positively limited in its response to said resilient urging, at least one of said jaw clutches having a blocker associated therewith for preventing axial engagement of said one jaw clutch in the event said blocker is rotationally not aligned with said one jaw clutch member, said improvement comprising:
means effective upon an axial separation of said jaw clutch members with the master clutch disengaged to cause said blocker to rotationally align with said one jaw clutch member.

24. The improved change gear system of claim 23 where said one clutch member is rotationally fixed to said output and said other clutch member is rotationally fixed to said driven gear.

25. The transmission of claim 24 wherein said blocker is a substantially nondeformable blocker ring surrounding said one clutch member and splined thereto, said one clutch member comprising at least one first partially removed tooth extending generally radially outwardly toward said blocker ring and said blocker ring comprising at least one first pair of spaced projections extending generally radially inwardly toward said first clutch member, said first pair of projections having a circumferential dimension smaller than the space defined between the clutch teeth immediately adjacent said first partially removed tooth and received in the space defined between the clutch teeth immediately adjacent said first partially removed tooth whereby said blocker ring will rotate relative to said first clutch member, by a predetermined, limited degree, said blocker ring tending to rotate with the second clutch member at the initiation of a clutch engaging operation, the space between the projections of said first pair of projections sufficient to permit passage of said first partially removed tooth when aligned therewith, said blocker effective to sense nonsynchronous rotation of said clutch members corresponding to blocker ring rotation relative to said first clutch member sufficient to cause said first partially removed tooth not to align the space between the first set of projections to block relative axial engagement of said clutch members.

26. The transmission of claim 25 wherein said means comprises a second tooth extending from said blocker ring toward said one clutch member and a second set of adjacent partially removed teeth extending from said one clutch member toward said blocker ring, said second tooth adapted to fit in the space between the partially removed teeth of said second set of adjacent partially removed teeth, said first partially removed tooth aligned with the space between the projections of said first set of projections when said second tooth is in the space between the partially removed teeth of the second set of adjacent partially removed teeth.

27. The transmission of claim 26 wherein said first partially removed tooth and said second set of partially removed teeth extend from opposite axial ends of said clutch member and said first set of projections and said second tooth extend from opposite axial ends of said blocker ring, said first partially removed tooth and said second tooth extend from the axial end of said clutch member and blocker ring, respectively, most distant from the second clutch member, at least one partially removed tooth of said second set of partially removed teeth includes a leading edge inclined toward the space between the partially removed teeth of the second set of partially removed teeth in the direction toward the second clutch member, contact with said leading edge by said second tooth under pressure tending to cause relative rotation of said blocker ring and first clutch member sufficient to cause said second tooth to enter the space between the partially removed teeth of the second set of partially removed teeth.

* * * * *